Sept. 29, 1959     L. OPPENHEIMER     2,906,629
PROCESS AND ARTICLE FOR TENDERIZING AND SEASONING MEATS
Filed May 28, 1958

LEON OPPENHEIMER
INVENTOR

BY Walter G. Finch
ATTORNEY

United States Patent Office 2,906,629
Patented Sept. 29, 1959

2,906,629

PROCESS AND ARTICLE FOR TENDERIZING AND SEASONING MEATS

Leon Oppenheimer, Baltimore, Md.

Application May 28, 1958, Serial No. 738,913

6 Claims. (Cl. 99—194)

This invention relates generally to meat products and, more particularly, it pertains to a new and useful process and article for tenderizing and seasoning meats of various types. This application is a continuation-in-part of U.S. patent application, Serial Number 652,303, filed April 11, 1957, by applicant for "Process and Article for Tenderizing and Seasoning Meats," now abandoned.

Various kinds of meats are often obtained which, when cooked are tough, dried out, and unpalatable to the consumer thereof. Such meats are, in reality, not tough but have been made so through the process of cooking.

Certain animals, for instance, due to the type of feeding, or because of exercising or aging, do not have fat distributed in the meat muscle. As a consequence, when the meat from these particular animals is prepared, it is tough and dehydrated. Good grades of meat, however, do have fat distributed in the meat muscle and, as a result, when they are prepared they are tender, juicy, and palatable. The distribution of fat in the meat muscle is known as marbleing. Certain cuts of good grades of meat, however, may not contain marbleing for any of the reasons given before and they, too may be tough and unpalatable when prepared.

In the roasting or cooking process of meat, the oven is usually heated to 400° F. The muscle of the meat that is being cooked, which is mostly water, escapes as steam after the temperature has reached above 212° F. This steam escapes because the pan or roaster in which it is being prepared is not generally sealed. With the escape of the water as steam from the meat, it shrinks and becomes hard and dry.

It is an object of this invention to provide a new and useful process as well as an article for tenderizing and seasoning meats.

Still another object of this invention is to provide a new process and article which may be used for tenderizing and seasoning all types of meats, particularly meats which are tough and spongy.

Still another object of this invention is to provide a process and an article for making meats juicy and tender, and, simultaneously, reduce the shrinkage of the meat to a minimum during cooking thereof.

Still other objects of this invention are to provide an article which contains the required ingredients for seasoning a meat; which is economical to manufacture, and which is efficient and reliable in operation for tenderizing and seasoning meat products of various types.

These and other objects of this invention, as well as the attendant advantages thereof, will be readily appreciated as the same become better understood by reference to the following detailed description when considered in connection with the accompanying drawings, in which.

Figure 1:
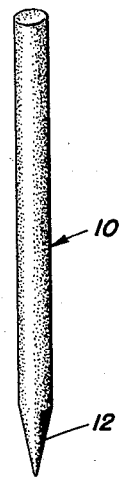
Fig. 1 is a perspective view of a frozen peg comprising this invention.
Figure 2:
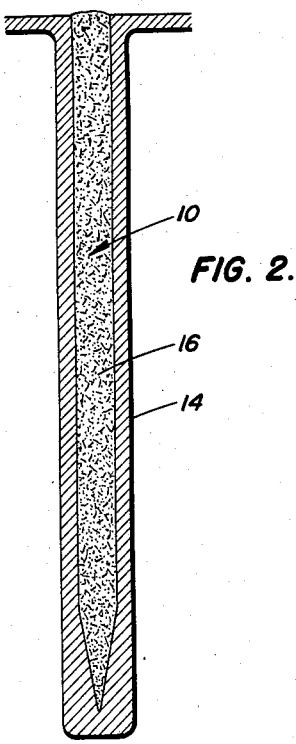
Fig. 2 is a longitudinal sectional taken through a mold, illustrating the forming of the peg of Fig. 1.
Figure 3:
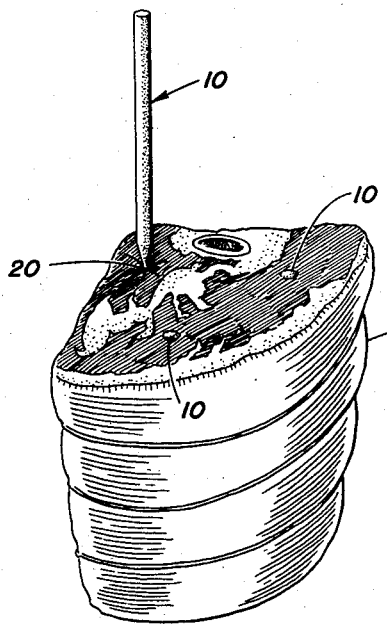
Fig. 3 is a perspective view of a brisket of beef illustrating the insertion of the peg of Fig. 1 therein.

Referring now to Figs. 1 to 3 of the drawing, there is illustrated a peg 10 having a pointed end 12 comprising this invention. This peg 10 is formed of flank or brisket fat. Flank or brisket fat is utilized in forming the spear because it is spongy and it does not disappear as quickly as kidney fat which is powdery.

In forming the peg 10, the flank or brisket fat is diced into small pieces approximately one inch in length. These pieces of fat are then mixed with gelatin which has been previously soaked in hot water.

The fat and gelatin are mixed together in a suitable container and then additional luke warm water is added until a paste is formed. Luke warm water is used to make the fat malleable. This mixture 16 of fat and gelatin is then put into a suitable cylindrical shaped mold 14, such as illustrated in Fig. 2 of the drawing. As shown, the mold 14 has a pointed end for forming the pointed end 12 of the peg. The mold 14 is generally the size of a pointed meat skewer or of an ordinary pencil.

The preparation of the mixture 16 of fat and gelatin requires that diluted gelatin be used because pure fat pegs 10, if frozen, would contain little moisture and would become brittle, with the result that when the peg or pegs are inserted into a meat product, they would fracture. Diluted gelatin adds distributed moisture to the mixture 16 and thus helps to make the frozen pegs 10 rigid. In addition, if the peg should become partly defrosted, the gelatin would help to keep the form of the peg 10 so that it could be refrozen.

In a specific example, the peg mixture is preferably formed of ten (10) percent by weight of gelatin, fifteen (15) percent by weight of water, and seventy-five (75) percent by weight of flank or brisket fat. These percentages, however, can vary from five (5) to fifteen (15) percent by weight for gelatin, seven and one half (7.5) percent to twenty-three and one half (23.5) percent by weight for water, and eighty-seven and one half (87.5) to sixty-one and one half (61.5) percent by weight of flank or brisket fat, respectively.

In inserting the peg 10 into the brisket of beef 18, the hole or holes 20 are made in the beef by inserting a meat skewer or similar object. When the meat skewer is withdrawn, the frozen fat peg 10 is inserted in the hole or holes 20 formed in the brisket of beef 18. It is to be pointed out that the more pegs 10 used in the meat, the more tender and juicy the meat will become during cooking. In addition, the pegs 10 will also keep the meat from drying out and thus eliminating basting of the meat during cooking.

If desired, suitable seasoning ingredients can be placed in the paste mixture 16 before it is formed into pegs 10 in the mold 14. By providing suitable seasoning in the pegs 10, the center of the meat will be properly seasoned.

It is also to be pointed out that when the peg 10 is inserted in the meat, as outlined above, the fat therein retains the oven heat, which is 400° F. as previously mentioned, and this burns out the meat tissues, thus making the meat tender. The fat melts, but it does not become steam. Thus, this fat is distributed in all parts of the brisket of beef 18, corresponding to internal basting. It keeps the meat saturated and prevents dehydration or shrinkage thereof. When the cooking is finished, the fat will have disappeared in the meat 18, and the holes 20 where the pegs 10 were inserted will contract and almost disappear, leaving the meat juicy and tender with little shrinkage thereof.

It is to be noted further that, in the case of turkey, the mixture 16 for the peg 10 can be made of the fat of turkey and inserted into the turkey breast with the consequence that the breast meat will be tender and juicy.

By utilizing the present process and article, a new market is created for two hard to sell by products, namely fat and gelatin. In addition, this process eliminates the old-fashioned way of inserting fat into a meat product with odd instruments being used for the insertion with the result that large holes were formed in the meat.

Obviously many modifications and variations of the present invention are possible in the light of the above teachings. It is, therefore, to be understood that within the scope of the appended claims, the invention may be practiced otherwise than as specifically described.

What is claimed is:

1. A process for forming a frozen peg for use in tenderizing a meat product during cooking, comprising, mixing diced pieces of fat of the brisket as well as flank types with gelatin and luke warm water to form a paste, and then freezing said mixture into the form of a pointed peg, with said fat, gelatin, and water being mixed in proportions of 87.5 to 61.5 percent, 5 to 15 percent, and 7.5 to 23.5 percent in weight, respectively.

2. A process for forming a frozen peg for use in tenderizing meat during cooking, comprising, mixing diced pieces of fat of the brisket as well as flank types with gelatin and luke warm water in proportions of 87.5 to 61.5 percent, 5 to 15 percent, and 7.5 to 23.5 percent in weight, respectively, to form a mixture paste, molding said mixture into the form of a pointed peg, and then freezing said peg.

3. A process for forming a frozen peg for use in tenderizing and seasoning meat during cooking, comprising, mixing diced pieces of fat of the brisket as well as flank types with gelatin, seasoning and luke warm water to form a paste mixture, molding said mixture into the form of a pointed peg, freezing said molded peg, and then inserting said frozen peg into a meat product, and cooking said meat product, whereby said meat product is tenderized and is seasoned, with said fat, gelatin, and water being mixed in proportions of 87.5 to 61.5 percent, 5 to 15 percent, and 7.5 to 23.5 percent by weight, respectively.

4. As an article of manufacture, a frozen peg, comprising, fat of the brisket as well as flank types, gelatin and luke warm water in range proportions of 87.5 to 61.5 percent, 5 to 15 percent, and 7.5 to 23.5 percent, by weight, respectively, said gelatin being diluted in said water, with said fat being intermixed in said gelatin mixture and frozen into said peg.

5. As an article of manufacture, a frozen molded, cylindrical shaped peg pointed at least one end and consisting of fat of the brisket as well as flank types, gelatin, and luke warm water in range proportions of 87.5 to 61.5 percent, 5 to 15 percent, and 7.5 to 23.5 percent, by weight, respectively, said gelatin being diluted in said water, with said fat being intermixed in said diluted gelatin mixture and frozen into said peg.

6. As an article of manufacture, a frozen molded, cylindrical shaped peg consisting of fat of the brisket as well as flank types, gelatin, and luke warm water in proportion of 75, 10, and 15 percent, by weight, respectively, said gelatin being diluted in said water, with said fat being intermixed in said diluted gelatin mxture and frozen.

References Cited in the file of this patent

UNITED STATES PATENTS

| 2,532,842 | Hill | Dec. 5, 1950 |
| 2,694,643 | Robinson et al. | Nov. 16, 1954 |

OTHER REFERENCES

Culinary Arts Institute Encyclopedic Cook Book 1948 by Ruth Burolzheimer, published by Culinary Arts Institute, Chicago, page 350.